May 8, 1951 — A. P. BLOXSOM — 2,552,394

LOCKING SLIDE FASTENER

Filed June 21, 1946

ALLAN P. BLOXSOM
INVENTOR.

BY Lester B. Clark
& Ray L. Smith
ATTORNEYS

Patented May 8, 1951

2,552,394

UNITED STATES PATENT OFFICE 2,552,394

LOCKING SLIDE FASTENER

Allan P. Bloxsom, Houston, Tex.

Application June 21, 1946, Serial No. 678,436

8 Claims. (Cl. 24—205.14)

This invention relates to hookless or slide fasteners and more particularly to a fastener of this type which provides adequate and automatic locking of the slide so that accidental displacement thereof is prevented.

It is well known that the slide of a conventional hookless fastener tends to move along and progressively release the interlocked series of fasteners when a strain is placed upon the open fasteners adjacent the slide. It is therefore necessary to provide locking means of some nature to hold the slide stationary except when the slide is to be moved to open or to close the fastener.

Various types of locking mechanisms have been developed, but such devices are of the manually operable type or, if automatic, are inadequate to assure that required locking will be maintained during normal use of the fastener.

The manually operable type of locking mechanism is time consuming and also presents the possibility of failure of the operator to actuate same. The automatic type of locking device heretofore known likewise presents possible failure in unfailingly accomplishing the purpose for which it is intended.

An important object of the invention is to provide an automatic fastener that overcomes the various disadvantages to which reference has just been made.

Another object is to provide a slide fastener having automatic, simple and positive locking means to prevent displacement of the slide when an opening strain is placed upon the fastener.

Still another object is to provide a slide having a tiltable member thereon carrying a locking prong which moves into locking engagement with the fasteners whenever there is a strain which tends to move the slide to open the fastener.

It is also an object to provide a slide that is freely movable whenever force is applied to the handle means thereon to move same along the fastener elements.

A still further and more specific object is to provide a slide having a locking plate that is movable to effect an interlock with the fastener elements whenever the elements in advance of the slide are displaced sidewardly and hence tend to move the slide along the elements.

The foregoing are the principal objects of the invention which, together with other objects and advantages will be more fully apparent from the following description taken in connection with the accompanying drawings in which.

Figure 3:
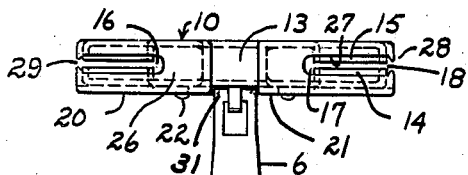
Fig. 3 is an end view of the slide taken from above in Figs. 1 and 2.

A slide fastener embodying the invention is shown in the drawings wherein there are shown at 1 and 2, tapes or other material to which are secured series of fastener elements 3 and 4 which are shown separated above the slide 5, but in interlocking relation therebelow.

As is well known, the slide 5 is movable along the series of fasteners by tension applied to the slide as by the handle 6 to progressively move the fastener elements into interlocking engagement or to release them from such engagement.

The slide 5 comprises a body 10 which may be of a composite construction, but preferably is a unit structure including upper and lower plate portions 11 and 12 interconnected by a neck portion 13. The side edges of these plate portions are oppositely flanged at 14 and 15 whereby there are formed passages 16 and 17 for the elements 3 and 4, there being slits 18 between the flanges 14 and 15 of sufficient width to permit free movement of the tapes or other material 1 and 2.

It is apparent that the entrance passages 16 and 17 converge in a manner that, as the slide 5 is moved, desired interengagement or release of the fastener elements 3 and 4 will be effected.

As already indicated, the invention is primarily concerned with a structure whereby the slide 5 will be locked against movement when tension is applied, tending to spread the fasteners 3 and 4 in advance of the slide. To this end there are provided a pair of elongated locking plates 20 and 21 which overlie a portion of the member at opposite sides of the centerline thereof. These locking plates are mounted upon pivot pins 22 whereby they become an integral part of the slide 5.

Figure 5:
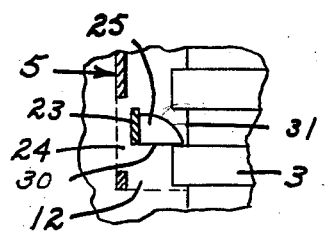
Fig. 5 is a detail partly in section, showing the locking prong and its manner of locking engagement with individual fastener elements.
Figure 4:
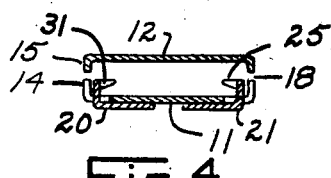
Fig. 4 is a sectional view taken on line 4—4 in Fig. 1.

The lower or trailing end of each of the locking plates has an ear 23 at its outer edge and this ear is flanged downwardly to enter a slot at 24 in the side of the plate portion 11. A prong 25, as best seen in Figs. 4 and 5, is secured to the ear 23 and extends inwardly therefrom. This prong has a flat lower face 30 and a tapered or an arcuate upper face 31. It seems apparent that the face 30 may engage one of the fastener elements 3, or 4, as indicated and restrain the slide against downward movement. If, however, the slide is moved upwardly to close the fastener, the prong 25 will ride upon the ends of the fastener elements as closure is effected.

Each of the locking plates 20 and 21 has a flange or lip 26 at its upper or leading end, and these lips have openings 27 of a size to freely pass the fasteners 3 and 4. The outer portion of each of these openings is reduced by inwardly projecting ears 28 which thereby form a narrow slit 29 which lie in a common plane with the slits 18 in the slide body. These likewise serve to admit free passage of the tape, or other material, 1 and 2 to which the fastener elements 3 and 4 are attached.

The operation of the structure just described is believed apparent from the foregoing description. By way of summary it is pointed out that whenever the fastener elements 3 and 4 in advance of the slide 5 are moved to the converging relation indicated in Fig. 1, the locking plates 20 and 21 are tilted to the position shown in solid lines whereby the prongs 25 engage at least one of the fastener elements 3 or 4 whereby locking of the slide is effected and movement thereof along the series of fastener elements is prevented.

Figure 1:
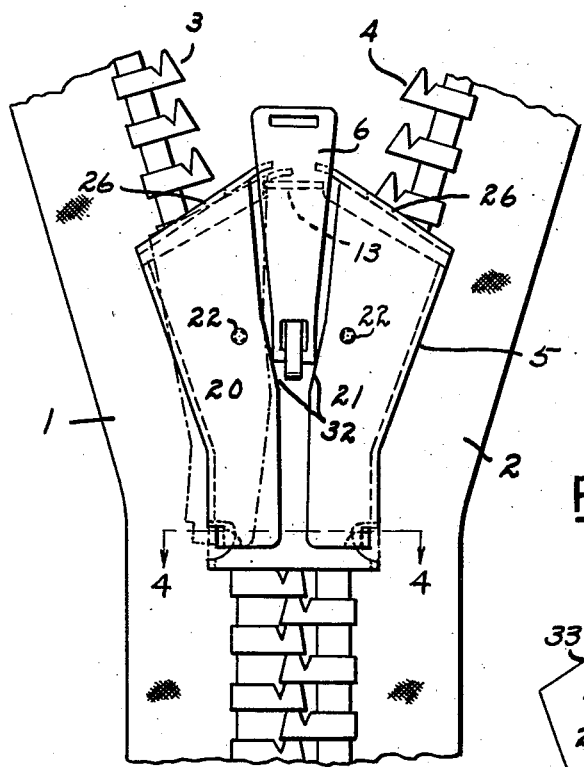
Fig. 1 is a fragmentary elevational view illustrating one embodiment of the invention, and showing series of the fastener elements in relative positions in open and closed portions of the fastener at opposite ends of the slide.
Figure 2:
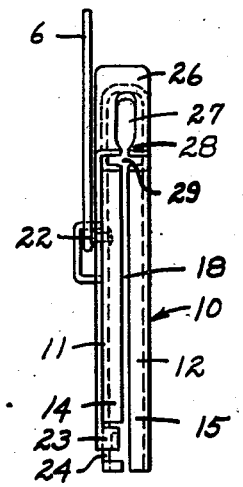
Fig. 2 is a side elevational view of the slide including the locking elements thereon.

If, however, the handle 6 is pulled downwardly, its edges 31 engage tapered edges 32 and move the plates 20 and 21 to a position as indicated in dotted outline in Fig. 1. This moves the prongs 25 outwardly whereby the slide is released for movement under the effort imparted thereto by the handle 6.

Figures 6, 7:
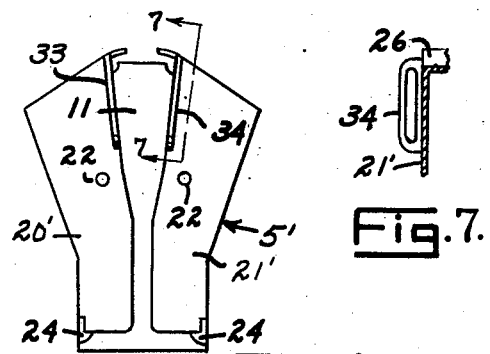
Fig. 6 is an elevational view of an alternate form of the slide.
Fig. 7 is a sectional view through one of the locking plates taken on line 7—7 in Fig. 6.

In the alternate form of slide 5' shown in Fig. 6, the handle 6 is omitted and instead there are provided upstanding ears 33 and 34 on the plates 20' and 21'. When this form of the invention is used the prongs 25 will, of course, automatically move to locking engagement as already explained. However, when grasping pressure is applied to ears 33 and 34, the locking plates are tilted to release the slide for closing or opening the fastener.

Broadly the invention comprehends a slide fastener of simple construction that is operable to automatically lock the slide thereof in position whenever a force is applied which tends to move the slide and open the fastener.

The invention claimed is:

1. In a slide fastener which includes adjacent series of fastener elements to be moved into locking and unlocking relation with respect to each other, a slider to move along said series and including upper and lower portions flanged inwardly at their side edges forming a passage for the elements and slits for the passage of material to which the elements are attached, a locking plate pivotally mounted on said slider, said plate including a lip at its leading end engageable for tilting movement of the plate by one of said series of elements, and a prong at the trailing end of said member extending toward one of said series for movement into locking engagement with the series when an opening strain is placed upon the open portion of the adjacent series.

2. In a slide fastener which includes adjacent series of fastener elements to be moved into locking and unlocking relation with respect to each other, a slider to move along said series and including upper and lower portions flanged inwardly at their side edges forming a passage for the elements and slits for the passage of material to which the elements are attached, there being an opening in the slider proximate one end thereof, a lock plate pivotally mounted on the slider, a prong on said plate projecting into said opening, and means on said plate engageable by a series of the fastener elements to pivotally move the plate and effect engagement of the prong with the series when an opening strain is produced upon the series.

3. A slide for a hookless fastener including, a slide body through which the fastener elements pass, a locking member on said body, means pivotally mounting said member upon the body to tilt transversely of the body, a prong on said member at its trailing end movable to and from locking engagement with fasteners passing through the body, and means on said member at its forward end engageable by fasteners at the entrance to the body for tilting the plate and moving the prong toward and from locking engagement with fastener elements passing through the slide as the elements entering the body move from and toward the line of movement of the body respectively.

4. A slide for a hookless fastener including, a slide body through which the fastener elements pass, a locking member on said body, means pivotally mounting said member upon the body to tilt transversely of the body, a prong on said member at its trailing end movable to and from locking engagement with fasteners passing through the body, and means on said member at its forward end engageable by fasteners at the entrance to the body for tilting the plate and moving the prong toward and from locking engagement with fastener elements passing through the slide as the elements entering the body move from and toward the line of movement of the body respectively, said prong having a tapered leading surface adapted to ride upon the fasteners when the slide is moved to close the fastener.

5. A slide for a hookless fastener including, a slide body through which the fastener elements pass, a pair of pivoted locking members on said body, an inwardly extending prong on each of said members for movement by pivoting of the members to and from locking engagement with fastener elements passing through the slide body, a lip on each of said members extending transversely of the body and overlying the entrances thereto, there being an opening in each of said lips for passing fastener elements so that the locking members are tilted by movements of the fasteners transversely of the direction of movement of the slide body to bring at least one of said prongs into engagement with one of the series of fasteners.

6. A slide for a hookless fastener comprising a slide body through which the fastener elements pass, a pair of locking plates pivotally mounted on said body for movement about axes transverse to the direction of movement of the body, a lip on each of said plates overlying the entrances for fastener elements to the body, there being passages in said lips for series of fastener elements to be interlocked by the slide, said passages being dimensioned to freely pass the elements but engageable thereby for sideward movement with the elements to rock said plates upon their pivots, and inwardly extending prongs on the plates opposite said lips movable inwardly into engagement with the fastening elements when the plates are rocked by elements entering the slide in converging relation.

7. A slide body for a series of fastener elements including, a pair of tiltable locking members on the body, said members having an apertured lip at the leading end overlying the entrance to the body, the aperture in each of said lips being dimensioned to freely pass a series of fastener elements but engageable by the fastener elements upon relative sideward movement of the fastener elements for sideward movement with the elements to tilt the associated locking member, and prongs on said members and extending inwardly proximate the trailing ends of the locking members to move into locking engagement when a force is applied tending to move the slide to open the fastener.

8. A slide body for a series of fastener elements including, a pair of tiltable locking members on the body, said members having an apertured lip at the leading end overlying the entrance to the body, the aperture in each of said lips being dimensioned to freely pass a series of fastener elements but engageable by the fastener elements upon relative sideward movement of the fastener elements for sideward movement with the elements to tilt the associated locking member, and prongs on said members and extending inwardly proximate the trailing ends of the locking members to move into locking engagement when a force is applied tending to move the slide to open the fastener, and manually operable means for retracting the prongs when the slide is to be moved to open the fastener.

ALLAN P. BLOXSOM.

REFERENCES CITED

The following references are of record in the file of this patent:

UNITED STATES PATENTS

| Number | Name | Date |
| --- | --- | --- |
| 2,185,658 | Carlile | Jan. 2, 1940 |
| 2,263,393 | Marinsky et al. | Nov. 18, 1941 |
| 2,295,426 | Poux | Sept. 8, 1942 |
| 2,345,883 | Plumley | Apr. 4, 1944 |